(12) United States Patent
Kumar et al.

(10) Patent No.: US 10,031,891 B2
(45) Date of Patent: Jul. 24, 2018

(54) DELIVERY AND DISPLAY OF PAGE PREVIEWS DURING PAGE RETRIEVAL EVENTS

(71) Applicant: Amazon Technologies, Inc., Reno, NV (US)

(72) Inventors: Rohit Krishna Kumar, Seattle, WA (US); Scott Zachary Bressler, Seattle, WA (US); Ivan King Yu Sham, Seattle, WA (US); Ian William Stewart, Seattle, WA (US); Brett Richard Taylor, Bainbridge Island, WA (US); Peter Frank Hill, Seattle, WA (US); Aakarsh Nair, Issaquah, WA (US); Steven Michael Reddie, Issaquah, WA (US); Patrick Joseph Armstrong, Seattle, WA (US); Samuel John Young, Seattle, WA (US); Ameet Nirmal Vaswani, Seattle, WA (US); Andrew Hayden, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 448 days.

(21) Appl. No.: 13/901,359

(22) Filed: May 23, 2013

(65) Prior Publication Data
US 2014/0136971 A1 May 15, 2014

Related U.S. Application Data

(60) Provisional application No. 61/726,510, filed on Nov. 14, 2012.

(51) Int. Cl.
*G06F 17/00* (2006.01)
*G06F 17/21* (2006.01)
(Continued)

(52) U.S. Cl.
CPC ........ *G06F 17/212* (2013.01); *G06F 17/2247* (2013.01); *G06F 17/30902* (2013.01); *G06F 17/30905* (2013.01)

(58) Field of Classification Search
CPC .... G06F 17/24; G06F 3/04883; G06F 3/0488; G06F 17/212; G06F 17/30899; G06F 17/2247; G06F 17/30905; G06F 17/30902
(Continued)

(56) References Cited

U.S. PATENT DOCUMENTS

| | | | |
|---|---|---|---|
| 5,500,933 A | 3/1996 | Schnorf | |
| 5,930,472 A | 7/1999 | Smith | |

(Continued)

FOREIGN PATENT DOCUMENTS

| | | |
|---|---|---|
| JP | 09-204347 | 8/1997 |
| JP | 2008-077353 | 4/2008 |

(Continued)

OTHER PUBLICATIONS

Anonymous, "ShrinkTheWeb (STW) Website Previews Plugin", http://web.archive.org/web/20120710154658/http://wordpress.org/extend/plugins/shrinktheweb-website-preview-plugin/screenshots/, Jul. 10, 2012, 3 pages.

(Continued)

*Primary Examiner* — Scott Baderman
*Assistant Examiner* — Jason Edwards
(74) *Attorney, Agent, or Firm* — Knobbe, Martens, Olson & Bear, LLP

(57) ABSTRACT

A system and process are disclosed for providing users with page previews during page loading events, such that the delay experienced before the display of page content is reduced. The previews may include screenshots of the pages or of portions thereof, and may be generated periodically and cached by the system for delivery to user devices. The (Continued)

process of generating and delivering the previews via the Internet or some other network may be implemented partly or wholly within an intermediary system that sits logically between the user devices and content servers. The process may be used with existing browsers without the need for any browser modifications, or may be used with a "preview-aware" browser that includes special program code for providing page previews.

19 Claims, 7 Drawing Sheets

(51) Int. Cl.
*G06F 17/22* (2006.01)
*G06F 17/30* (2006.01)

(58) Field of Classification Search
USPC .................................................. 715/273, 274
See application file for complete search history.

(56) References Cited

U.S. PATENT DOCUMENTS

| | | | |
|---|---|---|---|
| 5,978,842 | A | 11/1999 | Noble et al. |
| 5,982,392 | A | 11/1999 | Anfossi et al. |
| 6,061,715 | A | 5/2000 | Hawes |
| 6,230,168 | B1 | 5/2001 | Unger et al. |
| 6,271,840 | B1 | 8/2001 | Finseth et al. |
| 6,356,908 | B1 | 3/2002 | Brown et al. |
| 6,496,932 | B1 | 12/2002 | Trieger |
| 6,657,647 | B1 | 12/2003 | Bright |
| 7,051,084 | B1 | 5/2006 | Hayton et al. |
| 7,191,211 | B2 | 3/2007 | Tuli |
| 7,296,230 | B2 | 11/2007 | Fukatsu et al. |
| 7,310,769 | B1 | 12/2007 | Dash |
| 7,356,570 | B1 | 4/2008 | Tuli |
| 7,499,051 | B1 | 3/2009 | O'Donnell |
| 7,917,618 | B1 | 3/2011 | Bettis et al. |
| 7,975,019 | B1 | 7/2011 | Green et al. |
| 8,103,742 | B1 | 1/2012 | Green |
| 8,200,896 | B2 | 6/2012 | Schmieder et al. |
| 8,234,392 | B2 | 7/2012 | Graffagnino et al. |
| 8,311,900 | B1 | 11/2012 | Bates et al. |
| 8,314,809 | B1 | 11/2012 | Grabowski et al. |
| 8,331,566 | B1 * | 12/2012 | Foote .................. H04L 67/2828 380/255 |
| 8,365,144 | B1 | 1/2013 | Webb |
| 8,539,338 | B2 | 9/2013 | Zhu et al. |
| 8,610,725 | B2 | 12/2013 | Sandmel et al. |
| 8,732,571 | B2 | 5/2014 | Jain et al. |
| 8,754,827 | B2 | 6/2014 | Braghis et al. |
| 8,769,052 | B1 | 7/2014 | Tidd |
| 8,913,067 | B1 | 12/2014 | Kokkevis |
| 8,913,068 | B1 | 12/2014 | Kokkevis |
| 8,943,197 | B1 | 1/2015 | Taylor et al. |
| 8,990,674 | B2 | 3/2015 | Shibukawa et al. |
| 9,075,893 | B1 | 7/2015 | Jenkins |
| 9,454,515 | B1 | 9/2016 | Jain |
| 9,563,928 | B1 | 2/2017 | Sokolowski et al. |
| 9,563,929 | B1 | 2/2017 | Sokolowski et al. |
| 9,720,888 | B1 | 8/2017 | Jain et al. |
| 9,922,007 | B1 | 3/2018 | Jain et al. |
| 2001/0032238 | A1 | 10/2001 | Cronin, III et al. |
| 2001/0038395 | A1 * | 11/2001 | Holtzblatt et al. ............ 345/854 |
| 2002/0015042 | A1 | 2/2002 | Robotham |
| 2002/0078134 | A1 | 6/2002 | Stone et al. |
| 2002/0091738 | A1 | 7/2002 | Rohrabaugh |
| 2002/0170053 | A1 | 11/2002 | Peterka et al. |
| 2003/0014478 | A1 | 1/2003 | Noble |
| 2003/0025716 | A1 | 2/2003 | Colavin |
| 2003/0046365 | A1 | 3/2003 | Pfister et al. |
| 2003/0158916 | A1 | 8/2003 | Cronin, III et al. |
| 2003/0200507 | A1 | 10/2003 | Stern et al. |
| 2004/0095400 | A1 | 5/2004 | Anderson et al. |
| 2004/0135784 | A1 | 7/2004 | Cohen et al. |
| 2004/0186861 | A1 | 9/2004 | Phatak |
| 2004/0239681 | A1 | 12/2004 | Robotham et al. |
| 2005/0131887 | A1 | 6/2005 | Rohrabaugh |
| 2005/0232227 | A1 | 10/2005 | Jorgenson et al. |
| 2005/0243097 | A1 | 11/2005 | Cohen et al. |
| 2005/0256836 | A1 | 11/2005 | Awamoto et al. |
| 2006/0031774 | A1 | 2/2006 | Gaudette |
| 2006/0064467 | A1 | 3/2006 | Libby |
| 2006/0277478 | A1 | 12/2006 | Seraji et al. |
| 2007/0150820 | A1 | 6/2007 | Salvo |
| 2007/0156972 | A1 | 7/2007 | Uehara |
| 2007/0192509 | A1 | 8/2007 | Ohtsuka et al. |
| 2007/0234229 | A1 | 10/2007 | Ohtsuka et al. |
| 2007/0263007 | A1 | 11/2007 | Robotham et al. |
| 2007/0271288 | A1 | 11/2007 | Martin et al. |
| 2007/0288841 | A1 | 12/2007 | Rohrabaugh et al. |
| 2008/0018658 | A1 | 1/2008 | Bruno et al. |
| 2008/0034292 | A1 | 2/2008 | Brunner |
| 2008/0055623 | A1 | 3/2008 | Piersol et al. |
| 2008/0077862 | A1 | 3/2008 | Tolpin |
| 2008/0120393 | A1 | 5/2008 | Chen et al. |
| 2008/0120626 | A1 | 5/2008 | Graffagnino et al. |
| 2008/0181498 | A1 | 7/2008 | Swenson et al. |
| 2008/0222273 | A1 | 9/2008 | Lakshmanan et al. |
| 2008/0229025 | A1 | 9/2008 | Plamondon |
| 2008/0235594 | A1 * | 9/2008 | Bhumkar et al. ............. 715/738 |
| 2008/0295164 | A1 | 11/2008 | Steiner et al. |
| 2009/0002381 | A1 | 1/2009 | Harper et al. |
| 2009/0030976 | A1 | 1/2009 | Shukla |
| 2009/0033986 | A1 | 2/2009 | Himpe |
| 2009/0089448 | A1 * | 4/2009 | Sze ....................... G06F 9/4443 709/231 |
| 2009/0100356 | A1 * | 4/2009 | Kujda ................... G06F 17/212 715/760 |
| 2009/0125799 | A1 | 5/2009 | Kirby |
| 2009/0158134 | A1 | 6/2009 | Wang et al. |
| 2009/0158141 | A1 | 6/2009 | Bauchot et al. |
| 2009/0177996 | A1 | 7/2009 | Hunt et al. |
| 2009/0189890 | A1 | 7/2009 | Corbett et al. |
| 2009/0228782 | A1 | 9/2009 | Fraser |
| 2009/0238279 | A1 | 9/2009 | Tu |
| 2009/0307428 | A1 | 12/2009 | Schmieder et al. |
| 2009/0307571 | A1 | 12/2009 | Gowda et al. |
| 2009/0307603 | A1 | 12/2009 | Gowda et al. |
| 2010/0027663 | A1 | 2/2010 | Dai et al. |
| 2010/0049785 | A1 | 2/2010 | Stoyanov et al. |
| 2010/0194753 | A1 | 8/2010 | Robotham et al. |
| 2010/0269152 | A1 | 10/2010 | Pahlavan et al. |
| 2010/0281402 | A1 | 11/2010 | Staikos et al. |
| 2011/0029904 | A1 | 2/2011 | Smith et al. |
| 2011/0074765 | A1 | 3/2011 | Oterhals et al. |
| 2011/0078333 | A1 | 3/2011 | Jakubowski |
| 2011/0078593 | A1 | 3/2011 | Matsui |
| 2011/0080955 | A1 | 4/2011 | Shi et al. |
| 2011/0145695 | A1 | 6/2011 | Matsui |
| 2011/0197126 | A1 * | 8/2011 | Arastafar .......... G06F 17/30905 715/243 |
| 2011/0225520 | A1 | 9/2011 | Watanabe |
| 2011/0231746 | A1 | 9/2011 | Rohrabaugh et al. |
| 2011/0258532 | A1 | 10/2011 | Ceze et al. |
| 2011/0287750 | A1 | 11/2011 | Watanabe et al. |
| 2011/0302514 | A1 | 12/2011 | Rinaudo et al. |
| 2012/0001832 | A1 | 1/2012 | Braghis et al. |
| 2012/0022942 | A1 | 1/2012 | Holloway et al. |
| 2012/0030560 | A1 | 2/2012 | Yano |
| 2012/0047444 | A1 | 2/2012 | Adar et al. |
| 2012/0054166 | A1 | 3/2012 | Jeremias |
| 2012/0084663 | A1 | 4/2012 | Momchilov et al. |
| 2012/0102416 | A1 | 4/2012 | Chmiel |
| 2012/0110435 | A1 | 5/2012 | Green |
| 2012/0117145 | A1 | 5/2012 | Clift et al. |
| 2012/0131441 | A1 | 5/2012 | Jitkoff et al. |
| 2012/0151094 | A1 | 6/2012 | Cooke |
| 2012/0151308 | A1 | 6/2012 | Falkenberg |
| 2012/0159308 | A1 | 6/2012 | Tseng et al. |
| 2012/0188280 | A1 | 7/2012 | Charlesbois et al. |
| 2012/0191735 | A1 | 7/2012 | Duff et al. |
| 2012/0215834 | A1 | 8/2012 | Chen et al. |

(56) References Cited

U.S. PATENT DOCUMENTS

| | | | |
|---|---|---|---|
| 2012/0254727 A1* | 10/2012 | Jain | G06F 17/30905 715/234 |
| 2012/0254780 A1 | 10/2012 | Mouton et al. | |
| 2012/0256949 A1 | 10/2012 | Treat et al. | |
| 2012/0265802 A1 | 10/2012 | Shen et al. | |
| 2013/0050249 A1 | 2/2013 | Grabowski et al. | |
| 2013/0080895 A1* | 3/2013 | Rossman | G06F 3/04883 715/720 |
| 2013/0145259 A1 | 6/2013 | Kiefer, III et al. | |
| 2013/0159923 A1* | 6/2013 | French et al. | 715/790 |
| 2013/0185633 A1* | 7/2013 | Bunker | G06F 17/212 715/246 |
| 2013/0212462 A1 | 8/2013 | Athas | |
| 2014/0012685 A1 | 1/2014 | Le Chevalier | |
| 2014/0032964 A1 | 1/2014 | Neerincx | |
| 2014/0053054 A1 | 2/2014 | Shen | |
| 2014/0059421 A1 | 2/2014 | Chibisov et al. | |
| 2014/0129920 A1 | 5/2014 | Sheretov et al. | |
| 2014/0136942 A1 | 5/2014 | Kumar et al. | |
| 2014/0136951 A1 | 5/2014 | Kumar et al. | |
| 2014/0136973 A1 | 5/2014 | Kumar et al. | |
| 2014/0281894 A1 | 9/2014 | Maity et al. | |
| 2014/0281896 A1 | 9/2014 | Wiitala et al. | |
| 2015/0026566 A1 | 1/2015 | Hui et al. | |
| 2015/0089355 A1 | 3/2015 | Peng et al. | |
| 2015/0117515 A1 | 4/2015 | Fu et al. | |
| 2015/0121193 A1 | 4/2015 | Beveridge et al. | |
| 2015/0193409 A1 | 7/2015 | Portnoy et al. | |
| 2015/0242522 A1 | 8/2015 | Lin et al. | |
| 2015/0271188 A1 | 9/2015 | Call | |
| 2015/0293929 A1 | 10/2015 | Namgung | |
| 2016/0162597 A1 | 6/2016 | Karppanen | |
| 2017/0011017 A1 | 1/2017 | Jain | |

FOREIGN PATENT DOCUMENTS

| | | |
|---|---|---|
| JP | 2011-123697 | 6/2011 |
| JP | 2011-524033 | 8/2011 |

OTHER PUBLICATIONS

Anonymous, "ShrinkTheWeb—Website Previews API Documentation", http://web.archive.org/web/20121029152521/http://www.shrinktheweb.com/uploads/STW_API_Documentation.pdf, Oct. 29, 2012, 4 pages.

Esteveo, Martin, "Tiling in DirectX: Part 1", from gamedev.net, Jul. 24, 2000, 5pgs.

Esteveo, Martin, "Tiling in OpenGL", from gamedev.net, Dec. 12, 2000, 6 pgs.

Kokkevis, Vangelis "GPU Accelerated Compositing in Chrome" The Chromium Projects, 2012, 9 pages.

PCWorld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014), 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014), 2 pages.

Bahl et al., "Advancing the State of Mobile Cloud Computing", MCS' 12, Jun. 25, 2012, pp. 21-27.

Björk et al., "WEST: A Web Browser for Small Terminals", CHI Letters, 1999, vol. 1, No. 1, pp. 187-196.

Buyukkokten et al., "Power Browser: Efficient Web Browsing for PDAs", CHI Letters, 2000, vol. 2, No. 1, Apr. 1-6, 2000, pp. 430-437.

Deboosere et al., "Thin Client Computing Solutions in Low- and High-Motion Scenarios", Third International Conference on Networking and Services (ICNS'07), 2007, pp. 6.

Delwadia, Vipul, "RemoteME: Experiments in Thin-Client Mobile Computing", Thesis for Master of Science in Computer Science, Victoria University of Wellington, 2009, pp. 114.

Dyken et al., "A Framework for OpenGL Client-Server Rendering", 2012 IEEE 4th International Conference on Cloud Computing Technology and Science, 2012, pp. 729-734.

Fox et al., "Experience With Top Gun Wingman: A Proxy-Based Graphical Web Browser for the 3Com PalmPilot", Middleware'98, Session 9, 1998, pp. 407-424.

Freytag et al., "Resource Adaptive WWW Access for Mobile Applications", Computers & Graphics, 1999, vol. 23, pp. 841-848.

Han et al., "Dynamic Adaptation in an Image Transcoding Proxy for Mobile Web Browsing", IEEE Personal Communications, Dec. 1998, pp. 8-17.

Ku et al., "The Amazon Kindle Fire: Benchmarked, Tested, and Reviewed", http://www.tomshardware.com/reviews/amazon-kindle-fire-review,3076.html, Nov. 23, 2011, pp. 37.

Stokes, Jon, "Amazon's Silk is More Than Just a Browser: It's A Cloud OS for the Client", http://web.archive.org/web/20121217033708/http://www.wired.com/insights/2011/09/amazon-silk, Sep. 28, 2011, pp. 4.

Tendulkar et al., "Abusing Cloud-Based Browsers for Fun and Profit", ACSAC '12, Dec. 3-7, 2012, pp. 219-228.

Wang et al., "Accelerating the Mobile Web with Selective Offloading", MCC' 13, Aug. 12, 2013, pp. 45-50.

Weintraub, Levi, "How WebKit Renders the Web", Fluent Conference, May 31, 2012, pp. 67. http://www.slideshare.net/naseemh/airbnb-tech-talk.

Xiao et al., "Browsing on Small Displays by Transforming Web Pages into Hierarchically Structured Subpages", ACM Transactions on the Web, Jan. 2009, vol. 3, No. 1, pp. 36.

Zavou et al., "Exploiting Split Browsers for Efficiently Protecting User Data", CCSW' 12, Oct. 19, 2012, pp. 37-42.

International Search Report and Written Opinion in PCT Application No. PCT/US2013/069733, dated Jun. 30, 2014.

Garsiel et al., "How Browsers Work: Behind the Scenes of Modern Web Browsers", http://www.html5rocks.com/en/tutorials/internals/howbrowserswork/, Aug. 5, 2011, pp. 52.

Grosskurth et al., "Architecture and Evolution of the Modern Web Browser", http://grosskurth.ca/papers/browser-archevol-20060619.pdf, Jun. 20, 2006, pp. 24.

Herostratus' Legacy, "Composited Video Support in WebKitGTK+", https://blogs.igalia.com/viaquez/2013/07/26/composited-video-support-in-webkitgtk/, Jul. 26, 2013, pp. 8.

Stefanov, Stoyan, "Rendering: Repaint, Reflow/Relayout, Restyle", http://www.phpied.com/rendering-repaint-reflowrelayout-restyle/, Dec. 17, 2009, pp. 11.

Wiltzius, Tom, "Accelerated Rendering in Chrome", http://www.html5rocks.com/en/tutorials/speed/layers/, Mar. 11, 2013, pp. 11.

Xiao et al., "Web Page Adaptation for Small Screen Mobile Device: A New P2P Collaborative Deployment Approach", First International Conference on Intelligent Networks and Intelligent Systems, 2008, pp. 191-196.

Ranganathan et al., "A Lossless Image Compression Algorithm Using Variable Block Size Segmentation", IEEE Transactions on Image Processing, Oct. 1995, vol. 4, No. 10, pp. 1396-1406.

Vaisey et al., "Image Compression with Variable Block Size Segmentation", IEEE Transactions on Signal Processing, Aug. 1992, vol. 40, No. 8, pp. 2040-2060.

\* cited by examiner

DELIVERY AND DISPLAY OF PAGE PREVIEWS DURING PAGE RETRIEVAL EVENTS

CROSS-REFERENCE TO RELATED APPLICATION

This application claims priority under 35 U.S.C. § 119(e) to U.S. Provisional Application No. 61/726,510 filed on Nov. 14, 2012, which is hereby incorporated by reference in its entirety.

BACKGROUND

When a user requests a web page or other content page via a browser, the user typically experiences a noticeable delay before the page is fully or even partially displayed. Various factors can contribute to this delay. These factors include, for example, (1) the speed of the wireless or wired connection between the user's device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user's device. When the delay is significant (e.g., several seconds or more), the task of browsing can be frustrating for users.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
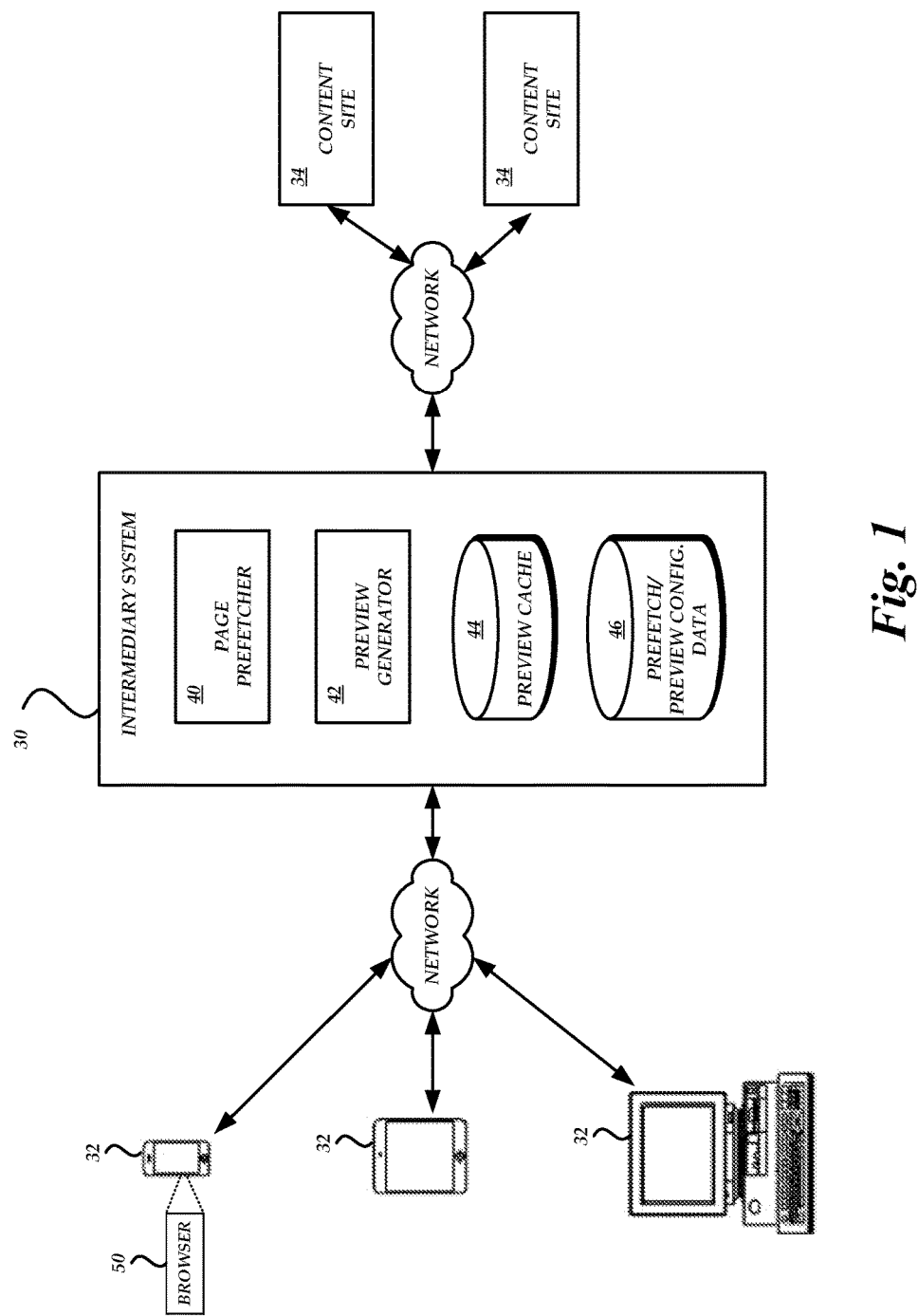
FIG. 1 illustrates an intermediary system that generates and delivers previews of content pages according to one embodiment.

A process is disclosed for providing users with preview content (e.g., page previews, interstitial pages, etc.) during page loading events such that the delay experienced before the display of page content is reduced. In some embodiments, the preview content may be a version of a content page that has been optimized, partially optimized, or otherwise modified to improve a loading characteristic (e.g., latency, bandwidth utilization, size, rendering time, or user-perceived loading time) in comparison with an unmodified version of the page. The process may be implemented partly or wholly within an intermediary system that sits logically between user devices and content servers. In some embodiments, the process may be implemented by a content delivery network (CDN). The process may be used with existing browsers without the need for any browser modifications, or may be used with a "preview-aware" browser that includes special program code for processing and displaying page previews and non-preview versions. When such "preview-aware" browsers are used, the process may be implemented by a third party server that does not act as an intermediary.

According to one embodiment, the intermediary system prefetches content pages, such as web pages, of various content sites, and generates and caches previews of these pages. The previews may include or consist of screenshot images ("screenshots") of the pages, such that minimal browser processing is required to display the previews. Different previews (e.g., with different screenshot resolutions) of the same page may be generated and cached for different user device types or form factors, such as smart phones, tablets, PCs, etc. In some embodiments, some or all of the links (or other active content) of the pages may be preserved when the previews are generated, such that users can, for example, select/follow links while viewing the preview. In some embodiments, a preview may not include any screenshots, or may include a combination of screenshot and non-screenshot files; for example, a preview can be delivered in two parts: a screenshot containing all of the non-textual of the page, and a textual overlay containing the page's textual content.

In one embodiment, when a user device requests a page for which a preview exists, the intermediary system returns a cached preview of the page as it retrieves the actual page (typically from a corresponding origin server). The browser running on the user device displays this preview while the intermediary system retrieves and delivers the page. (The intermediary system may pre-render or otherwise modify portions of the actual page before delivering it to browser.) The preview may continue to be displayed as the browser renders the page in the background. Once the actual page is loaded, the browser updates the display by replacing the preview with the actual page. If the user scrolls down or zooms in on the preview before this update occurs, the browser preferably applies such scrolling or zooming to the actual page when updating the display.

In some embodiments or use cases, rather than returning the actual page, the intermediary system may only return one or more portions of the page. For example, the intermediary system may only return the portions that differ (or differ in a meaningful way) from the preview, or may only return those portions that were delivered as screenshots. In these embodiments, the browser may be configured to update the display of the page preview by replacing or overwriting one or more specific portions of the preview.

In some embodiments, site owners or other content providers may provide or specify preview content that is to be used for a particular content item or a group of items. The site owner may embed data into the content item, such as by including a Uniform Resource Locator ("URL") of a preview image in a particular tag of a Hypertext Markup Language ("HTML") file. An intermediary system that processes a request for the content item may recognize the particular tag and provide the preview image at the referenced location to a requesting user device. While the preview is transmitted to the user device, or subsequent to completion of the transmission, the intermediary system can obtain a current version of the requested content for transmission to the user device.

The intermediary system may, in some embodiments, predictively prefetch pages for particular users during browsing sessions of such users, and may generate and cache (or preemptively deliver) previews of these pages. For example, when the intermediary system retrieves a page on behalf of a user/device, it may predictively follow some or all of the links on the page, and generate previews of these pages. If the user subsequently selects one of the predictively followed links, the intermediary system may then deliver the preview as described above. In some embodiments, the intermediary system may determine which link or links a user is most likely to activate, and predictively prefetch non-preview versions of those linked content items, while also predictively providing preview versions of linked items that the user may not be as likely to request. For example, the linked item that the user is most likely to request may be prefetched as a non-preview version, while a preview version of the linked content item that the user is second most likely to request may be generated and/or preemptively provided to the user device. Where predictive prefetching is implemented, the intermediary system may maintain copies of users' cookies, and may transmit the relevant cookie when predictively following a link; thus, the predictively prefetched pages (and their previews) may be personalized for users.

System Components

FIG. 1 illustrates one embodiment of an intermediary system 30 capable of operating as described above. The intermediary system 30 serves as an intermediary between user devices 32 (e.g., smart phones, tablets, PCs, e-book readers, etc.) and content sites 34, such as web sites. In some embodiments, the intermediary system 30 may, for example, be or act as a proxy server, a partial rendering engine for specific browsers or device types, a CDN, an Internet Service Provider ("ISP") system, or a combination thereof. Each user device 32 runs a browser application 50 ("browser") capable of retrieving and displaying content pages according to standard protocols. The browsers 50 may be designed or configured to retrieve web pages via the intermediary system 30. In some embodiments, the browsers 50 may be (or may include) conventional web browsers that are not specifically designed or configured to display page previews. In other embodiments, the browsers 50 may be specifically designed to handle specific tasks associated with the display of page previews.

The content sites 34 may include or consist of ordinary web sites. The pages for which page previews are generated can be conventional web pages that do not include any special coding or formatting to support the generation of previews as described herein. In some embodiments, however, the intermediary system 30 may support the use of special preview tags for designating whether or how page previews should be generated for particular pages. Where preview tags are supported, a content provider may, for example, embed tags in a content page indicating, for example, which visual elements or sections of the page should be converted into screenshots or where the intermediary system may obtain a previously-generated preview of the content page.

As shown in FIG. 1, the intermediary system 30 includes a page prefetcher 40, a preview generator 42, a preview cache 44, and a data repository 46 of prefetch/preview configuration data. The page prefetcher 40 is responsible for prefetching pages from various content sites 34 for purposes of generating page previews. The pages that are prefetched may, for example, be (1) pre-selected by administrators, (2) selected automatically based on page popularity data (as measured, e.g., based on page requests processed by the intermediary system), and/or (3) identified by predictively following links of pages being loaded by user devices. For some or all of the pages selected for prefetching, the page prefetcher 40 may prefetch each page periodically at a regular interval, such as every 1 to 3 minutes. This interval may be fixed, or may vary on a per-page or per-site basis based, e.g., on a measure of how frequently meaningful changes are made to the page or site content.

Each time a page is prefetched, the preview generator 42 generates a preview of the prefetched page, and stores the preview in the cache 44 in place of the most recently generated preview. The preview generator may generate and cache multiple previews of the same page, with each being tailored to a particular device or device characteristic (e.g., screen size, browser characteristics, touch screen versus non-touch screen, etc.). The previews may include or consist of screenshots of the prefetched pages or portions thereof. In some embodiments, the previews may also include HTML code, including HTML image maps that enable users to select links depicted in the screenshots and access the linked content. In some embodiments, rather than generating a preview of a prefetched content page, the preview generator 42 may obtain a preview (e.g., an image or interstitial page) identified by the content site 34 as the desired preview for a content page from that content site 34. For example, the current or full version of the content page may include meta data, custom markup tags, or other information that identifies the preview item that is to be used for the page, and the preview generator can obtain that preview item. The preview item may be obtained proactively and stored in the preview cache 44 (e.g., prior to receiving a request for the content item from a user device 32), or reactively (e.g., in response to a request, from a user device 32, for the content page).

As depicted by the data repository 46, various types of configuration data may be maintained and used to control the process of prefetching pages and generating page previews. This data may include, for example, a list of the sites or pages that are eligible for prefetching, data regarding prefetch intervals to be used for particular pages or sites, and data regarding the devices or device characteristics for which previews are to be generated. As mentioned above, the intermediary system 30 may also maintain copies of the browser cookies stored on particular user devices 32, and may use these cookies to predictively prefetch pages for specific users.

In addition or as an alternative to using a page prefetcher 40, the intermediary system 30 may generate the previews from page content retrieved by the intermediary system 30 on behalf of the user devices.

The components and modules of the intermediary system 30 illustrated in FIG. 1 are illustrative only, and are not intended to be limiting. In some embodiments, the intermediary system 30 may include fewer, additional, or alternative components or modules. For example, the intermediary system 30 may include a content fetcher or request processor that retrieves requested content items on behalf of user devices 32 and provides non-preview versions to the user devices 32 as described herein. As another example, the intermediary system 30 may include a rendering engine or some other component with browser functionality to process retrieved content items and send processed versions to a user device 32. In some embodiments, the intermediary system 30 may establish a remote desktop connection (e.g., using Remote Desktop Protocol ("RDP")) or some similar connection with a user device 32. The intermediary system 30 may render preview content and non-preview versions of requested content, and transmit representations of the rendered content to the user device 32 for display such that little or no content processing is done on the user device 32.

Page Delivery Process Flow

Figure 2:
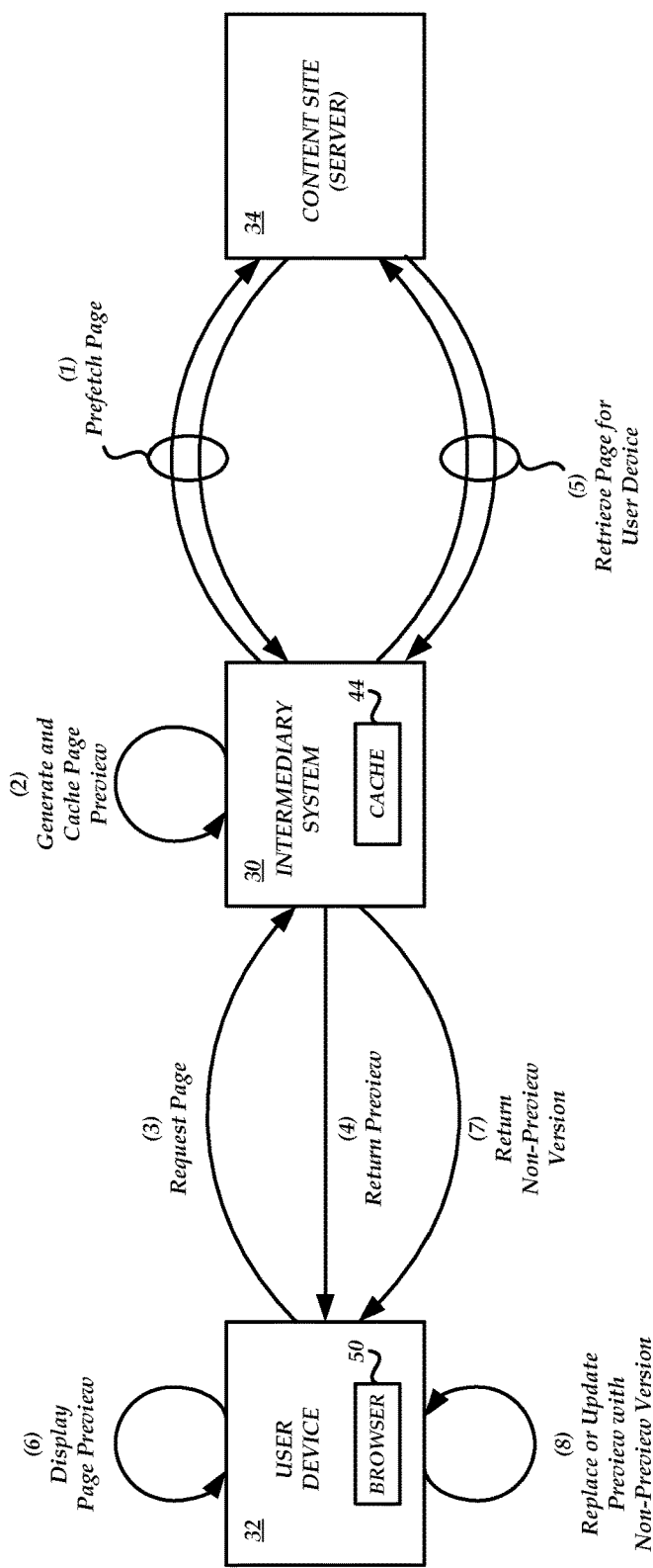
FIG. 2 illustrates the process by which a page preview may be generated, and temporarily displayed on a user device while the actual page is loading, according to one embodiment.

FIG. 2 illustrates the general process by which the intermediary system 30 may prefetch pages and handle browser requests according to one embodiment. In event 1, the intermediary system 30 prefetches a page from a content site 34. As mentioned above, this prefetch event may occur according to a periodic schedule, or may be performed predictively based on another page requested by the user device 32. In some embodiments, the intermediary system 30 may be configured to service content requests from multiple user devices. In such cases, the intermediary system 30 may obtain content and generate previews of the content in response to requests from a first user device, and then provide those previews to a second user device 32 at a subsequent time. If retrieval of content and generation of previews is performed predictively, the intermediary system 30 may, in some embodiments, send a cookie corresponding to the user device 32 and content site 34 with the page request. In this way, the content site 34 may return a page that is personalized for the particular user, and a screenshot of the personalized page may be generated. As mentioned above, prefetching of pages is not essential. Although the page is shown as being retrieved from a single content site or server, some components of the page (such as images or advertisements) may be retrieved from separate servers and domains.

In event 2, the intermediary system 30 generates and caches a preview of the page. If the page was prefetched without use of a cookie corresponding to the user device 32, the intermediary system 30 may subsequently deliver this preview to any user device that subsequently requests the page. If prefetched using a cookie, the preview may be designated as being personal to the user device 32, or to a user or user account associated with the user device 32.

When generating the preview, the intermediary system 30 may generate a screenshot of the entire page, or may generate multiple screenshots, each of a different respective portion of the page. To preserve active content (links and other selectable elements) on the page, the preview generator may also generate an image map for each screenshot. Each such image map specifies the coordinates within the screenshot of one or more hot spots, and specifies the target URL of each such hot spot, as is known in the art. To reduce the complexity of the image maps, the intermediary system 30 may, in some cases, only include hot spots of some of the links on the page, such as those that are selected the most frequently by users. In some cases, the intermediary system may, in generating a page preview, store some or all of the page's text in a non-image format; for example, the intermediary system 30 may create a text overlay file that can be combined by the browser 50 with an image file to produce the page preview.

In some embodiments, the intermediary system 30 may generate executable code or customized representations of content to facilitate the use of interactive controls and other objects while a preview is displayed. For example, a lightweight document object model ("DOM") may be generated for use by a user device when the user device renders preview content. The DOM may be streamlined such that it includes only certain desired objects (e.g., text boxes or other input controls), and properties that instruct a browser 50 on the user device 32 to display the objects appropriately (e.g., at the location where the input control is shown in the preview image). Other items that are typically included in a full DOM of a content page (e.g., objects representing each image or other media item of the content page) can be excluded from the lightweight DOM because a static visual representation of such objects may be part of the preview image. A user may therefore be provided with some degree of interactivity, even though a substantially static preview is being displayed rather than a fully functional non-preview version of the requested content.

In event 3, the user device 32 subsequently requests the page. In events 4 and 5, which may overlap in time (e.g., may be performed in parallel) or be performed in a different order than shown, the intermediary system 30 responds to the page request by (a) returning the cached page preview to the user device 32, and (b) retrieving the requested page from the content site 34 on behalf of the user device 32. The process used to deliver the preview in event 4 may depend on whether the device's browser 50 supports the display of page previews. If it does not, as in the case of a conventional browser, the intermediary system 30 may first return a special HTML file, referred to herein as an HTML preview file, that instructs the browser 50 to retrieve one or more cached screenshots (or other cached preview objects) from the intermediary system 30. This process will be discussed below with reference to FIG. 3.

In event 6, which may overlap with event 5 and/or event 7, the browser 50 displays the page preview. Typically, the page preview is displayed noticeably faster than the actual page would be displayed if no previews were delivered. There are a several reasons for this. First, because the preview is already cached on the intermediary system 30, the round trip delay associated with retrieving the page from the content site 34 is avoided. Second, the additional round-trip delays associated with requesting any embedded objects from the content server 34 or a third party server (e.g., a CDN server) are typically avoided. Third, depending upon the process used to generate the preview, the preview may be capable of being delivered and displayed more rapidly than the actual page. For example, complex coding that ordinarily results in a browser 50 processing delay may be omitted from the preview, allowing it to be displayed more rapidly upon its arrival. As another example, a preview image of a content page, such as an image created according to the Joint Photographic Experts Group ("JPEG") standard, may have a substantially smaller data size than the requested content item as a whole, and therefore may be transmitted more quickly than, e.g., a complete web page.

The speed at which the preview is delivered and displayed can be further increased by optimizing the previews for specific device types or form factors. For example, a lower screenshot resolution may be used for smart phones versus tablets, so that the screenshots can be delivered faster. (The screenshot resolutions may also be selected based on aggregated, browser-reported data regarding how frequently and quickly mobile device users tend to zoom-in on the particular page or on pages in general.) As another example, a page may be subdivided (for purposes of generating multiple screenshots) based on the screen dimensions of the user device. For example, one screenshot may be generated for the "above-the-fold" portion of the page that, given the device's screen dimensions, would appear on the screen when the page is first displayed. One or more additional screenshots may be generated of the remainder (below-the-fold) portion of the page to which the user can scroll, if desired. With this approach, the above-the-fold screenshot may be delivered and displayed first, so that the above-the-fold portion of the preview is displayed faster than would be possible if a single screenshot were used for the entire page.

In some embodiments or use cases, the intermediary system 30 may only deliver the above-the-fold screenshot, such that no below-the-fold content is included in the preview. This may be suitable or desirable where the user is unlikely to scroll down on the page during the preview-display stage. The intermediary system 30 may determine whether to use this approach for a particular page based on one or more factors, such as (1) data regarding how frequently (and how quickly) users scroll down on the particular page, and (2) the estimated amount of time the preview will be displayed before it is replaced with the actual page.

In event 7, the intermediary system 30 delivers to the browser a non-preview version of the page based on the page content retrieved in event 5. A non-preview version of the page may be a substantially current version of the page retrieved from the content site 34. In some embodiments, the intermediary system 30 may perform an analysis of differences between the substantially current version of the page and the preview version that was previously provided to the client device 32. Representations of differences between the substantially current version and the preview version may then be provided to the client device 32. For example, one or more preview updates, such as replacement text, replacement images or portions of images, replacement byte ranges, and the like may be generated and sent to the client device 32. The browser 50 can then display a non-preview version by applying the preview update(s) to the preview version, replacing one or more portions of the preview version with the preview update(s), overlaying the preview update(s) on the corresponding portion(s) of the preview version, etc.

The non-preview version may be identical in format to the page retrieved in event 5, or may be a modified or partial version of it. The intermediary system 30 may modify or optimize the retrieved page in various ways to generate the non-preview version, For example, the intermediary system 30 may reduce the resolutions of selected images on the page to enable them to load faster, especially for mobile devices. As another example, the intermediary system 30 may generate and deliver a single file that fully represents the entire page, including embedded images or objects that would ordinarily be separately retrieved by the browser. As yet another example, the intermediary system 30 may only deliver certain portions of the page, such as portions that differ or were omitted from the preview. Thus, the non-preview version delivered in event 7 may differ in format from the page retrieved in event 5, and/or may be an incomplete representation of the actual page.

In some embodiments, as shown in FIG. 2, the non-preview version of the requested content may be delivered without a second request or follow-up request from the browser 50. For example, a preview-aware browser may communicate with the intermediary system 30 using a bi-directional communication protocol, such as SPDY, WebSocket, or the like. Once a user device and a network system (such as the intermediary system 30) establish a connection using a bi-directional communication protocol, the network system may transmit content items and other data to the user device without first requiring a request from the user device, as is typically required in Hypertext Transfer Protocol ("HTTP") connections. By using such a bi-directional communication protocol, the intermediary system 30 can send preview content to the user device 32 in response to a content request. Subsequently, or in parallel, the intermediary system 30 can transmit to the client device 32 a non-preview version of the requested content page without requiring a second request from the client device 32.

In some embodiments, the user device 32 may retrieve the actual page from the content site 34, rather than receiving a non-preview version of the page from the intermediary system 30. In such cases, the user device 32 may transmit an initial request to the intermediary system 30 for the preview, and subsequently (or in parallel) request the actual page from the content site 34. The user device 32 or the browser 50 executing thereon may be configured to initially request previews from an intermediary system 30 while still retrieving the actual page from the content site 34. Alternatively, the preview or other data that the intermediary system 30 sends to the user device 32 may instruct the browser 50 to retrieve the actual page from the content site 34 rather than waiting to receive it from the intermediary system 30.

As the non-preview version is loaded on the user device 32, it is maintained hidden by the browser. For example, the non-preview version may be loaded into a separate frame buffer, or it may be rendered into a hidden "tab," browser window, or other content display element supported by the browser 50. Events 5 and 7 in FIG. 2 may overlap, such that the intermediary system 30 delivers portions of the non-preview version of the page while retrieving other portions. As mentioned above, in other embodiments the intermediary system 30 may only deliver certain portions of the actual page, such as those portions that differ (or differ meaningfully) from the preview.

In event 8, the browser 50 replaces the display of the preview with a display of the non-preview version based on the content received in event 7. (If the intermediary system 30 only delivers the portions that differ from the preview, the browser 50 may alternatively update the preview by replacing the relevant portions.) For example, if the non-preview version was loaded and rendered into a hidden tab, the hidden tab may be un-hidden or otherwise made visible, while the tab in which the preview was displayed may be hidden. In typical use case scenarios, this transition occurs a few seconds after the display of the preview. From the user's perspective, the transition from the preview to the actual (non-preview) page is typically similar in appearance to the transition that occurs when a conventional browser finishes loading a page. Thus, the user typically will not be aware that a transition from a preview to the actual page is occurring. Typically, the visual content of the actual page will be the same or similar to that of the preview, especially if the intermediary system 30 generates previews of the page on a frequent basis (e.g., every few minutes).

As described above, in some embodiments the preview may include interactive objects, such as text boxes or other input controls. Users may interact with such objects prior to event 7 or 8. For example, including a text box can allow a user to begin entering text in the text box. When the user device 32 replaces the preview with the non-preview version in event 8, the user device 32 can copy the contents of the temporary preview version of the text box to the non-preview version so that the user does not lose any work, and so that the change to the non-preview appears to occur seamlessly or substantially seamlessly. If the user is actively entering text in the text box, the user device 32 may direct input to the non-preview version of the text box when it is ready, and automatically place the cursor in the proper location of the non-preview version of the text box when it is displayed.

A preview-aware browser 50 may be configured to automatically copy the input from the preview version to the non-preview version prior to or during display of the non-preview version, such that it does so without any additional instructions or code from the intermediary system 30. An existing browser (e.g., one that is not preview-aware or does not contain custom code to automatically copy over the input) may be provided with instructions or other executable code by the intermediary system 30. For example, the HTML preview file, or the non-preview version may include JavaScript or some other executable code to facilitate copying the input from the preview version to the non-preview version.

In some embodiments, the intermediary system 30 may programmatically determine, at the time of a page request, whether to deliver a preview of the requested page. This determination may be based on a variety of factors, such as one or more of the following: (1) the connection speed between the user device 32 and the intermediary system 30, or between the content site 34 and the intermediary system 30, (2) the size and complexity of the requested page, as may be known to the intermediary system 30 based on previous accesses to the page, (3) the average delay (or most recent delay) encountered by the intermediary system 30 when retrieving this page, or when retrieving pages of the target site generally, (4) the frequency with which the content of the page changes.

Delivery Process for Existing Browsers

Figure 3:
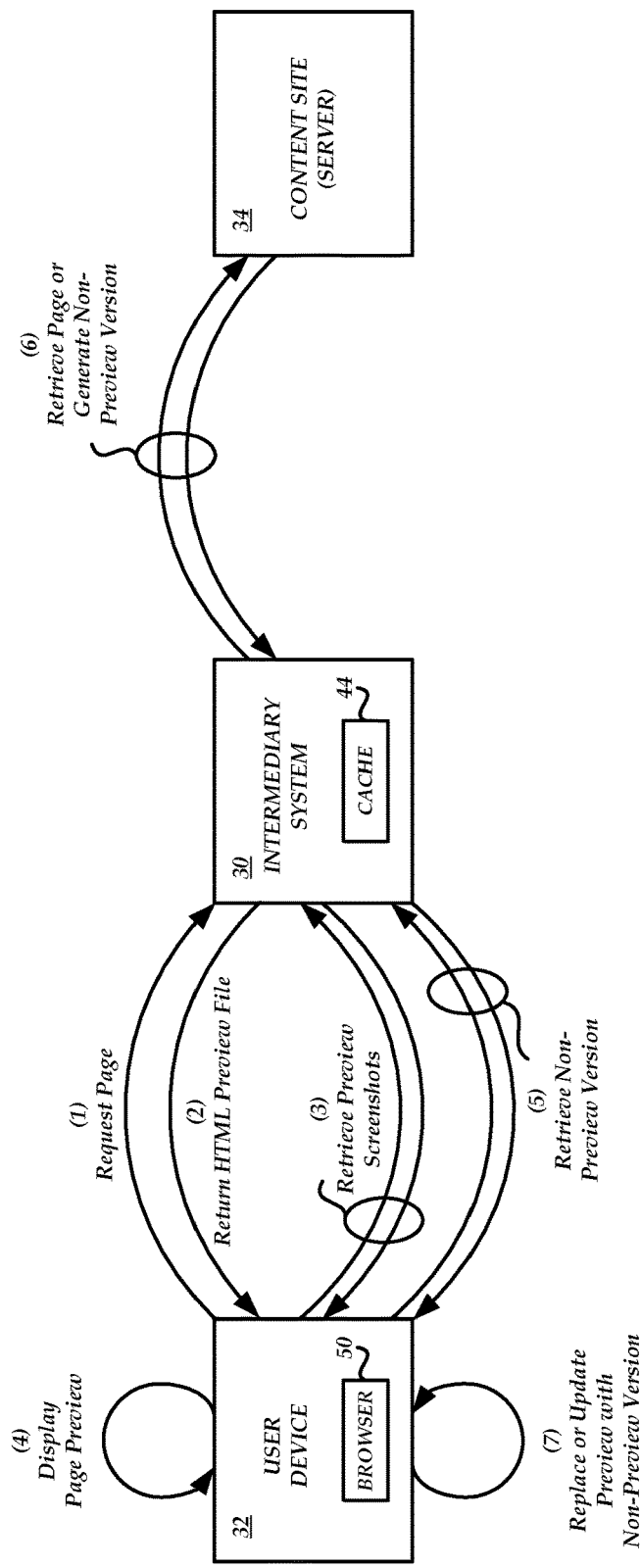
FIG. 3 illustrates a process that may be used with existing browsers to deliver and temporarily display the page previews.

FIG. 3 illustrates a process that may be used to provide page previews within preexisting browsers (i.e., those that are not "preview-aware"). It is assumed in this example that the intermediary system 30 already has a preview of the page in its cache 44. In event 1 of FIG. 3, the browser 50 sends a request to the intermediary system 30 for the page. In event 2, the intermediary system 30 returns an HTML preview file instead of the actual page. The HTML preview file specifies the screenshot(s) to be retrieved by the browser 50 from the intermediary system 30, and may include an image map for each such screenshot, as described above. One example of such a preview file is shown in table 1, with the image map removed and replaced with the text "[IMAGE MAP GOES HERE]."

TABLE 1

```
<!DOCTYPE html>
<html>
<head>
<title>CNN.com - Breaking News, U.S., World, Weather,
Entertainment & Video News</title>
<style>
html, body {padding: 0; margin: 0; width: 100%; height: 100%;}
.mainFrame {border: none; position: absolute; top: 0px; left: 0px;
padding: 0; margin: 0; width: 1002px; height: 3618px;}
#frame {display: none;}
</style>
<noscript>
<meta http-equiv="refresh" content="0;
URL=http://www.cnn.com/?screenshot bypass=1" />
</noscript>
</head>
<body>
<img id="image" src="http://static-
screenshots.s3.com/screenshots/f84bcecf-4f22-480b-9b6c-
dfe5f206089b.jpg"
alt="" usemap="#screenshot_map" />
<map name="screenshot_map" id="image_map">
```

TABLE 1-continued

```
[IMAGE MAP GOES HERE]
</map>
<iframe id="frame" class="mainFrame"
src="http://www.cnn.com/?screenshot bypass=1"
scrolling="no"></iframe>
<script type="text/javascript">
(function( ) {
    var image = document.getElementById("image");
    var frame = document.getElementById("frame");
    var map = document.getElementById("image_map");
    frame.onload = function( ) {
        frame.style.display = "block";
        image.style.display = "none";
        image.parentElement.removeChild(image);
        image = null;
        map.parentElement.removeChild(map);
        map = null;
        var frameHead =
    frame.contentDocument.getElementsByTagName("head");
        if (frameHead) {
            var baseTarget =
            frame.contentDocument.createElement("base");
            baseTarget.setAttribute("target", "_parent");
            frameHead[0].appendChild(baseTarget);
        }
    }
})( );
</script>
</body>
</html>
```

In event 3, the browser 50 may retrieve the preview screenshot(s) referenced in the HTML preview file. The HTML preview file shown in Table 1 corresponds to a page associated with CNN.com, and references a single screenshot named f84bcecf-4f22-480b-9b6c-dfe5f206089b.jpg. As described herein, multiple screenshots may be used in some embodiments. Illustratively, the screenshot referenced in the HTML preview file shown in Table 1 is not retrieved from http://www.cnn.com or some associated server, but rather from http://static-screenshots.s3.com, which may correspond to the intermediary system 30 or some other server or system associated with the intermediary system 30. The screenshot is of the entire page, and the image map specifies the coordinates of some or all of the links on the page. The user can select/follow links on the page while viewing preview file.

In some embodiments, user interface features other than image maps may be included in the preview. For example, if a content page includes "onmouseover" or "onhover" features that initiate display of supplemental content (e.g., descriptions of items over which a user hovers a mouse), such features may be included in the preview. In additional embodiments, inclusion of such additional user interface features may be based on the characteristics and capabilities of the target user device. For example, if a target device has only a touch screen input and not a mouse input, then the additional processing required to add an "onmouseover" or "onhover" event handler to a preview file may be skipped because such a feature is not easily accessible on the target device. As another example, layout hints or data regarding the structure of the actual content page may be provided along with or for use with the preview. For example, the layout of "div" markup tags may be provided so that features such as double-tap to zoom work as expected with the preview.

The screenshot is initially the only object of the HTML body that is visible to the user. The particular screenshot that is specified may be selected by the intermediary system 30 based on characteristics of the user device 32, such as its form factor or screen size. The characteristics of the device 32 may be communicated to the intermediary system 30 with the page request, or may be looked up by the intermediary system 30 based on a cookie or other identifier transmitted with the page request.

In event 5, the browser 50 may begin the process of preparing a non-preview version of the page for display. A container element, which in this example is an "iframe" element that has been given the ID "frame," is used to load the current version of the page. In some embodiments, a different container element may be used, such as a "div" or "object" element. As seen in the "frame.src" attribute of the sample HTML file in Table 1, the content of the iframe element is a document located at the http://www.cnn.com URL. The intermediary system 30 has appended the query string "?screenshot_bypass=1" onto the end of the URL. This query string may not be passed to the origin server or some other server associated with http://www.cnn.com. Rather, the query string may be an indicator to the intermediary system 30 that this particular request for the page located at http://www.cnn.com is for the actual page, and not for the screenshot. The presence of the query string "?screenshot_bypass=1" indicates that the HTML preview file has already been transmitted to the user device 32. In some embodiments, other techniques may be used to signal to the intermediary system 30 that a request should be serviced with the actual page rather than a screenshot. For example, cookies, self-posting forms, HTTP headers, and the like may be used to transmit information back to the intermediary system 30.

In event 6, the intermediary system 30 can retrieve the requested page from the origin server, a CDN server, or some other content source associated with the content site 34. In some embodiments, the intermediary system 30 augments the retrieved (actual) page with JavaScript code, or other executable code, that instructs the browser 50 to display the page once the actual page (with or without modifications by the intermediary system) has finished loading. This may be accomplished using a JavaScript "onload" event. As mentioned above, the intermediary system 30 may also make other changes to the page (e.g., reduce resolutions of images) to better optimize it for delivery to and display on particular types of devices.

In event 7, the browser 50 can process and display the non-preview version of the page. As seen in the "frame.onload" attribute, the iframe element is associated with a JavaScript function that executes when the content of the iframe (e.g., http://www.cnn.com) finishes loading. In particular, when the content of the iframe element finishes loading, the function defined in the "frame.onload" attribute executes instructions to display the iframe (e.g., "frame.style.display=block;") and then hide the screenshot (e.g., "image.style.display=none;"). In some embodiments, the order may be reversed, such that the image is first hidden and then the iframe is displayed.

In some embodiments, additional steps can be taken to make sure the iframe is loaded with a reasonable representation of the final size of the contents within so that scrolling the final document works seamlessly. A <base> tag can be added to the <head> of the document that is loaded into the iframe so that links clicked within the iframe itself are loaded in the parent document, not within the iframe. Finally, the screenshot image can be removed when the iframe loads to alleviate processing and storage pressure on the browser 50.

Implementations Using Preview-Aware Browsers

With further reference to FIG. 3, if a preview-aware browser 50 is used, event 5 may be omitted, and events 2 and 3 may be replaced with a single event in which the intermediary system 30 delivers the preview. The preview-aware browser 50 may also include other functionality for supporting the display of previews. For example, the browser 50 may include a user settings menu (or a link to a settings page) for enabling the user to specify one or more of the following: (1) whether previews should be displayed, (2) the conditions under which previews should be displayed (e.g., only when Wi-Fi is available, only for particular sites, etc.), (3) what screenshot resolutions should be used for previews, (4) whether advertisements should be omitted from the previews, (5) whether a "preview-only" browsing mode (described below) should be used, (6) whether the intermediary system 30 should perform predictive prefetching (as described above), and if so, whether the user's cookies should be used to support personalized previews.

Where predictive prefetching is used, the preview-aware browser 50 may also be capable of receiving and caching the previews in the background, such that a predictively generated preview may be delivered to the user device 32 before the corresponding page is requested. In some embodiments, the intermediary system 30 may predictively prefetch content that is referenced by a currently requested or displayed content item (e.g., hyperlinked content).

Figure 5:
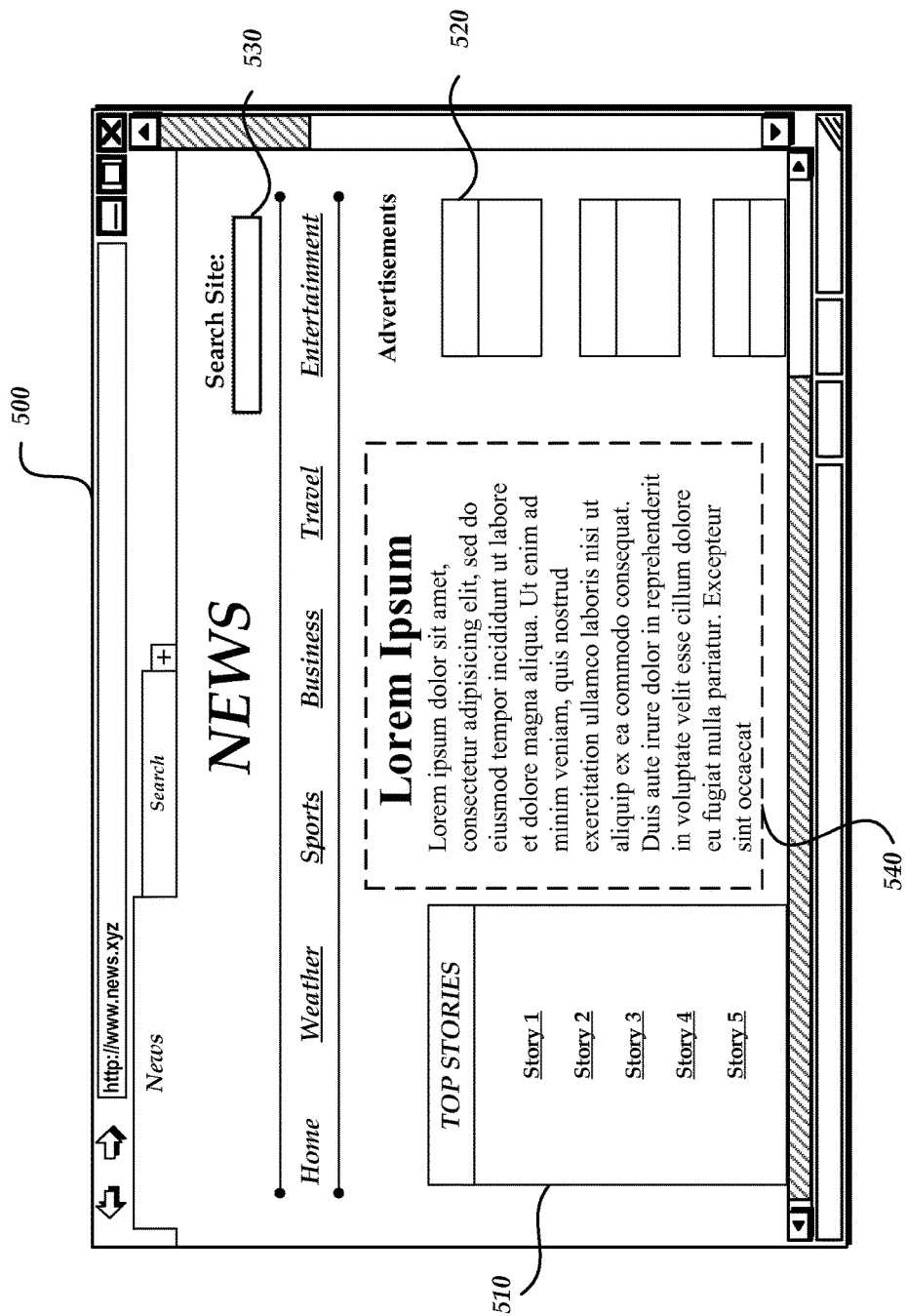
FIG. 5 illustrates a browser interface displaying a preview of an example content item while a non-preview version of the content item is obtained.

FIG. 5 illustrates an example browser interface 500 displaying a content item. Illustratively, the content item shown in FIG. 5 has a "Top Stories" section 510 that includes several links to other content items. The intermediary system 30 may include functionality that generates a prediction regarding which of the links in the "Top Stories" section 510 the current user is likely to click next (e.g., based on an analysis of the user's prior content requests and/or demographic information), or which link any user in general is likely to click next. If the browser 50 is a preview-aware browser, the intermediary system 30 can transmit previews of content likely to be requested. In some embodiments, such as when the browser 50 is not a preview-aware browser, the intermediary system 30 may include code in the preview file that is sent to the user device 32. The user device 32 may execute the added code to precache preview images for linked content items most likely to be subsequently requested.

In some embodiments, the intermediary system 30 may cause (e.g., using one of the techniques described above) previews to be sent to the user device 32 for one or more content items that are less likely to be subsequently requested, while causing full versions or otherwise non-preview versions to be sent to the user device 32 for one or more of the most likely content items to be subsequently requested. In this way, the user device 32 can have ready access to non-preview versions of the content items most likely to be requested next, while also having access to at least a preview of a content item that may be less likely to be requested next without consuming the bandwidth and storage space required to retrieve non-preview versions of all items.

The content item illustrated in FIG. 5 also includes a text box 530. As described above, such a text box 530 may be displayed over a preview, thereby allowing a user to begin entering text in the text box 530 before a non-preview version of the page is received or displayed. The intermediary system 30 may provide information to the browser 50, such as coordinates regarding where to display the text box 530 so that it is in the same location as the text box of the preview, how the text box 530 is to behave (e.g., style information regarding the font, etc.), and the like.

The content item shown in FIG. 5 includes a central content area 540. Illustratively, the content item may be a news web page, and the central content area 540 may be used to show the current top story, breaking news, or the like. Some browser applications allow a user to quickly zoom the display on a particular area, such the central content area 540, in response to a double tap by the user on the particular area. Conventionally, browsers use various features of the content page, such as <div> tags or columns of a <table>, to determine how to zoom the display on a particular area in response to a double tap. If the central content area 540 is in the middle column of a three column table (e.g., a first column for the "Top Stories" section 510, a second column for the central content area 540, and a third column for advertisements 520) and the user double taps within the middle column, a browser can zoom the display on the central content area 540. However, if only a preview image is being shown, the browser 50 may not have knowledge of any particular area of the image on which to zoom. To provide double-tap-to-zoom functionality to content previews, the intermediary system 30 may provide a lightweight DOM, as described above, or a simplified HTML page may be provided. The DOM or HTML page may define areas of the preview image that correspond to areas of the non-preview version, thereby providing the browser 50 with information to determine how to zoom in response to a double tap input or some other zoom command. For example, the HTML page many include code defining a simple <table> with three columns, or a DOM may include corresponding representations of such a table.

The preview-aware browser 50 may also include other functionality for enabling the intermediary system 30 to customize or personalize the process for particular users. For example, the browser 50 may collect and report usage data regarding how frequently the user zooms-in on and scrolls down on the preview pages. The intermediary system 30 may use this data to, for example, select the particular screenshots that are best suited for the user's browsing behaviors. The preview-aware browser 50 may also report to the intermediary system 30 other information that may be useful for selecting appropriate screenshots, such as information regarding the user device's processing power, screen size, number of applications running, etc. Further, the preview-aware browser may support one or more special touch screen gestures for interacting with previews. One example of such a gesture is described below.

The preview-aware browser may also support the ability for the intermediary system 30 to deliver only those portions of the actual page that differ or were omitted from the preview. For example, once a preview has been delivered, the intermediary system 30 may, by performing a comparison, determine that a particular section of the page has changed, and may deliver to the browser 50 an HTML sequence corresponding to this section. The preview-aware browser may then replace only that portion of the preview, without replacing any other portions of the preview. As another example, the preview may only include a byte range or some of the pixel data of an image on the page, in which case the intermediary system may subsequently deliver—and the preview-aware browser fill in—the omitted pixel data.

The preview-aware browser 50 may also include special functionality for rendering previews. For example, as mentioned above, the intermediary system 30 may be configured to deliver both (1) an image file representing the image content of the page, and (2) a non-image overlay file, such as an HTML file, containing the textual content in non-image format. In such embodiments, the browser 50 may be configured to combine these two types of files to generate the preview.

Where this method is used, the intermediary system 30 may, where applicable, subsequently send a new overlay file (without sending a new image file) that is based on the page retrieved in event 5 of FIG. 2. Thus, for example, if the page includes personalized textual content not included in the preview, the intermediary system may just send a new overlay file containing this personalized content; the preview-aware browser would then update the display of the preview using the new overlay file, without changing the image content.

Preview-Only Browsing Modes

In some embodiments, the system may support a "preview only" browsing mode in which the intermediary system 30, by default, only delivers the page previews (when available), and does not deliver the actual pages. Users may be able to enable and disable this mode via a browser setting, or through a configuration site. Where a preview-aware browser 50 is used, the browser 50 may support a special touch screen gesture that enables the user to request the actual page while viewing its preview. For example, if the user taps twice on a particular area of the screen, the browser could respond by requesting and loading the actual page.

In some embodiments, the intermediary system 30 or the browser 50 may automatically enter "preview only" browsing mode (e.g., without user initiation of the "preview only" mode). This may be triggered in response to various system or network conditions. For example, if the intermediary system 30 or browser 50 determines that the network link between the intermediary system 30 and the user device 32 is slow, "preview only" mode may be automatically triggered. As another example, "preview only" mode may be automatically triggered if the intermediary system 30 or browser 50 detects that there may not be enough available resources on the user device 32 to permit satisfactory rendering of a particular page or an entire browsing session.

Process for Prefetching Pages and Generating Previews

Figure 4:
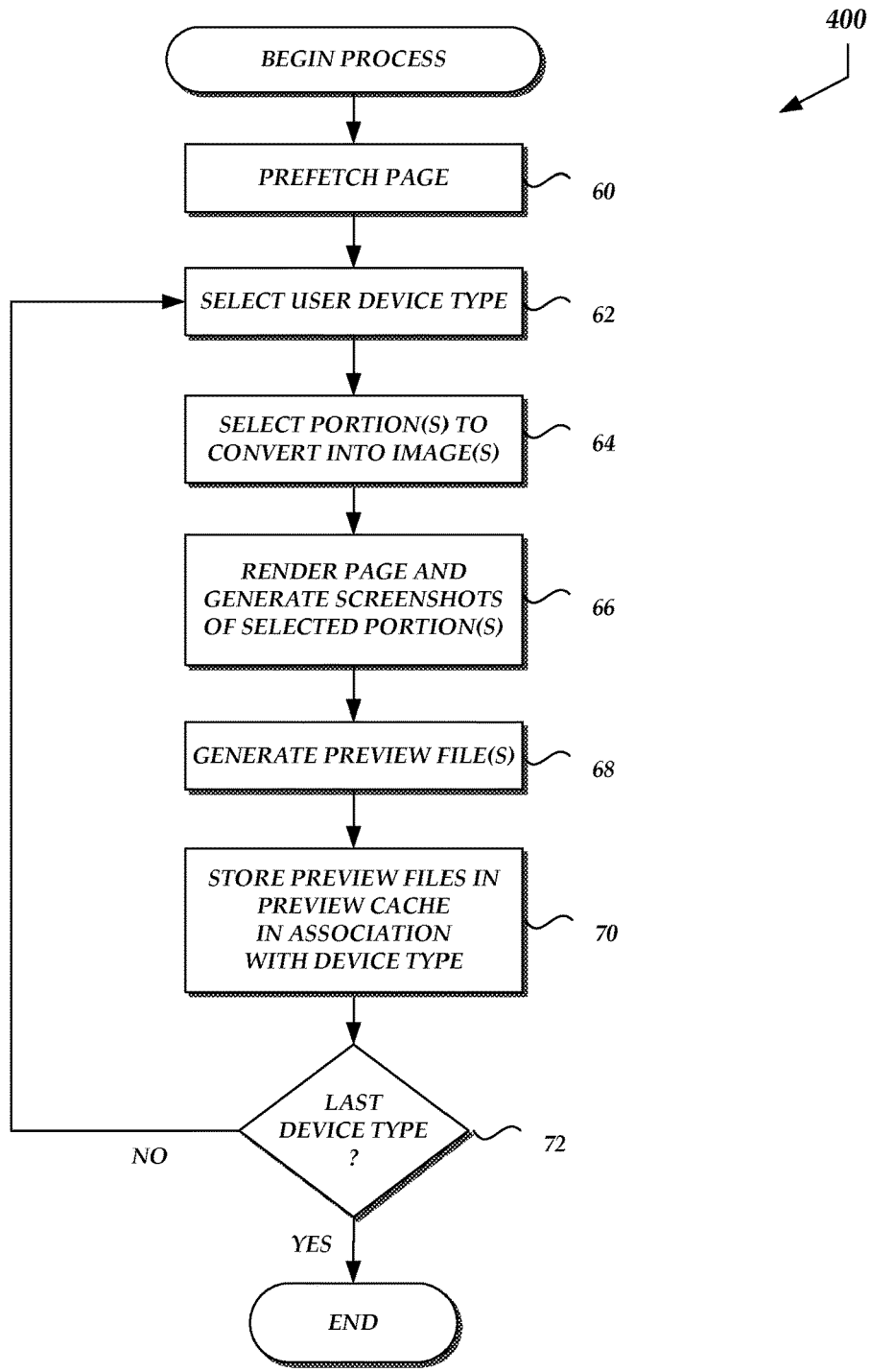
FIG. 4 illustrates a process that may be implemented by the intermediary system to prefetch, and generate previews of, content pages.

FIG. 4 illustrates one embodiment of a process that may be used by the intermediary system 30, and particularly the page prefetcher 40 and preview generator 42 (FIG. 1), to generate previews. This process may be repeated periodically (e.g., every few minutes) for a given page to maintain previews that are relatively up-to-date. In this particular embodiment, the preview generator 42 generates multiple previews for each prefetched page, which each preview corresponding to a different device type. The preview generator 42 may also generate different previews for preview-aware versus non-preview-aware browsers 50.

In block 60, the page prefetcher 40 prefetches a page from a content site 34. In block 62, the preview generator 42 selects the first device type for which to generate a preview. Different previews may, for example, be generated for different screen sizes, for different device connection speeds, for different browsers, etc.

In block 64 of FIG. 4, the preview generator 42 selects the particular portion or portions to convert to screenshots. In some embodiments, the preview generator 42 may generate a single screenshot of the entire page. In other embodiments, different screenshots may be generated of different portions of the page, as described above. In some cases, the preview generator 42 may generate screenshots only of certain portions of a page (e.g., those containing complex coding that would slow the rendering process), while leaving other portions in the page unchanged. The preview generator 42 thus may analyze the coding of a prefetched page to determine which portions, if any, should be converted to screenshots.

In block 66 of FIG. 4, the preview generator 42 renders the page and generates the screenshot(s) of the selected portion(s). In block 68, the preview generator 42 may generate one or more additional preview files, such as an HTML preview file as described above. In some embodiments, image maps, "onmouseover" event handlers, and other user interface features may be included in the preview in order to provide a user with functionality that the user may expect from the actual page or a non-preview version of the page. The inclusion of these and other user interface features can be based on the device to which the preview is targeted. For example, if a content page includes "onmouseover" or "onhover" features that initiate display of supplemental content (e.g., descriptions of items over which a user hovers a mouse), such features may be included in the preview if the target device is capable of activating such feature (e.g., a desktop computer with a mouse can activate "onhover" events, while a tablet computer with only a touch screen may not be able to do so). As another example, layout hints or data regarding the structure of the actual content page may be provided along with or for use with the preview. For example, the layout of "div" markup tags may be provided so that features such as double-tap to zoom work as expected with the preview.

In block 70, the preview file or files, including any screenshots, are stored in the preview cache 44 in association with the selected device type (e.g., with data indicating to which device types or characteristics the particular screenshots apply). As depicted by block 72, the process may then be repeated for one or more additional device types.

Process for Responding to User Device Requests

Figure 6:
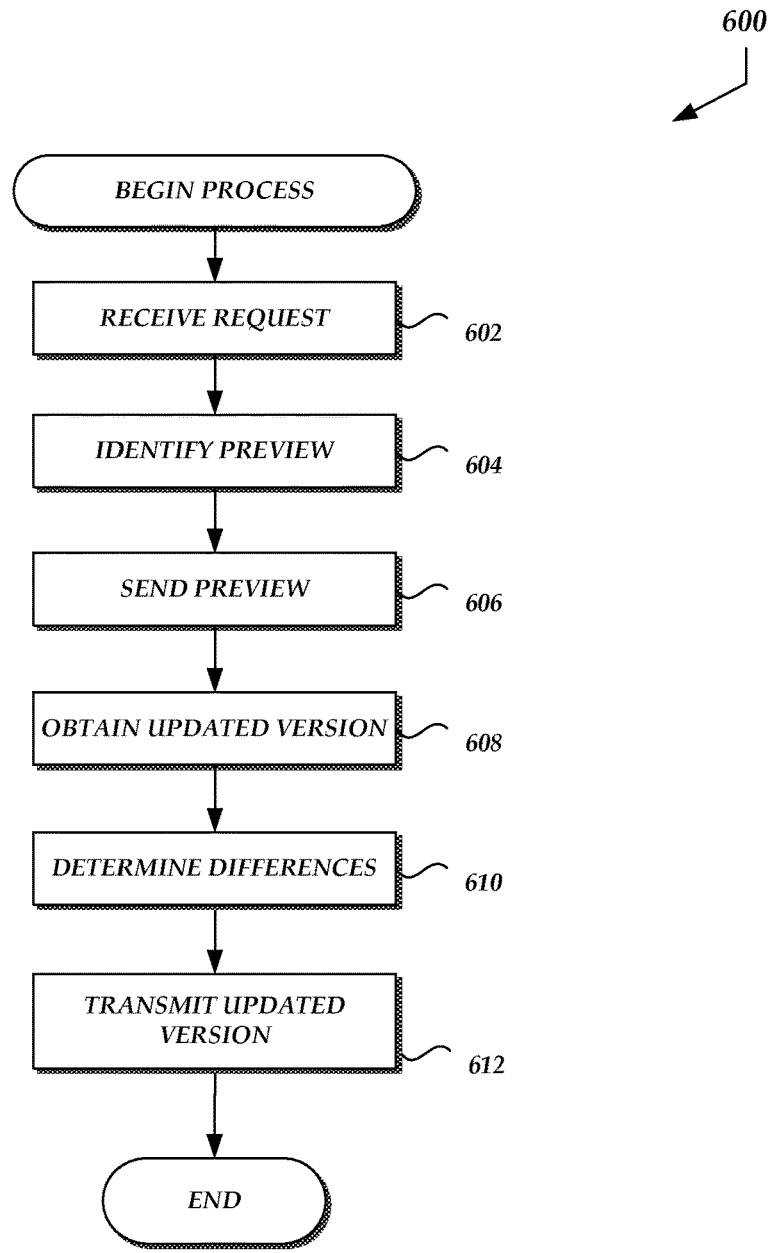
FIG. 6 illustrates a process for responding to a request for a content item by initially providing a preview of the content item and also obtaining a non-preview version of the content item.

FIG. 6 illustrates an embodiment of a process 600 for responding to requests from user devices for content pages. An intermediary system 30 may execute the process 600 to provide previews that may be displayed while the intermediary system 30 obtains and transmits a non-preview version of requested content to a user device 32. The process 600 may begin at block 602, where the intermediary system 30 receives a content request from a user device 32. Illustratively, the content request may be a request for a content item hosted or offered by a content site 34.

At block 604, the intermediary system 30 may identify which preview, if any, to send to the user device 32. As described above, the intermediary system 30 may have a previously generated preview of the content item available in a cache 44. As also described above, different previews may be generated for different devices or device configurations. The intermediary system 30 may locate an appropriate version of the preview for the current user device 32. For example, the intermediary system 30 may receive or have access to data regarding the screen resolution of the requesting user device 32, the screen orientation (e.g., portrait or landscape), the rendering capabilities of the browser 50, and the like. If no appropriate preview is available in the cache 44, the intermediary system 30 may exit process 600 and proceed to serve the request by obtaining a non-preview version of the requested content from the corresponding content site 34.

In some embodiments, a content site 34 or other content provider may specify that a preview is not to be used for a particular content page. Illustratively, it may be desirable to specify that no preview is to be used for time-sensitive or rapidly changing content (e.g., stock quote pages), personal content (e.g., banking pages), or content for which a user is expected to pay. In some embodiments, a content site 34 or other content source may specify that a preview is only to be used for a particular period of time before it is to be discarded or replaced. Illustratively, such a feature may be implemented in a manner similar to that used to identify how long an item may be cached.

In some embodiments, a content site 34 or other content source may specify that particular previews or interstitial pages or images are to be used, rather than previews generated by the intermediary system 34. Illustratively, the content source may insert a tag or other data in a content item that specifies the location or other identifying information of the object (e.g., preview image or interstitial page) that is to be provided to user devices 32 for temporary display while the requested content is retrieved and/or rendered. Cookies or other user-identifying information may be used by the intermediary system 30 in conjunction with the content source to provide customized interstitial or temporary pages, such as pages directed to particular geographic regions or the like.

At block 606, the intermediary system 30 can send the preview or other temporary item to the user device 32. At block 608, the intermediary system 30 can obtain an updated version of the requested content item from the corresponding content site 34 or other content source. In some cases, block 608 may be executed in parallel with blocks 604 and/or 606 so as to reduce the total amount of time elapsed between the receipt of the request at block 602 and the time at which the updated version of the requested content is obtained.

At block 610, the intermediary system 30 may optionally determine whether and/or how significantly the updated version of the content item differs from the preview sent to the user device 32. If current version of the content is identical or substantially identical to the preview that has already been sent to the user device 32, the intermediary system 30 may determine that no non-preview version is to be sent. Illustratively, such a determination may be made when a content item is substantially static or non-interactive such that providing a non-preview version does not enhance the user experience, or when the preview that was sent provides user interaction features (e.g., image maps, as described above).

In some embodiments, the intermediary system 30 may select or generate for transmission to the user device 32 only those portions of the current version that differ from the preview version. For example, the intermediary system 30 may determine that certain images of the current version are different than those of the preview version. The intermediary system 30 can include those images in the non-preview version that is sent to the user device 32, while excluding any images that have not changed. In some embodiments, the intermediary system 30 may be configured to refrain from sending updated images of advertisements.

As another example, the intermediary system 30 may compare the text of the preview version to the text of the current version, particularly if a textual overlay was provided to the user device 32 as described above. If there are differences, the intermediary system 30 may provide an updated textual overlay. Alternatively, or if no textual overlay was provided with the preview version, the intermediary system 30 may provide data regarding which portions of the preview version to update, the HTML file of the current version, etc.

At block 612, the intermediary system 30 transmits the updated version, or a portion thereof, to the requesting user device 32.

Process for Displaying Preview and Non-Preview Versions

Figure 7:
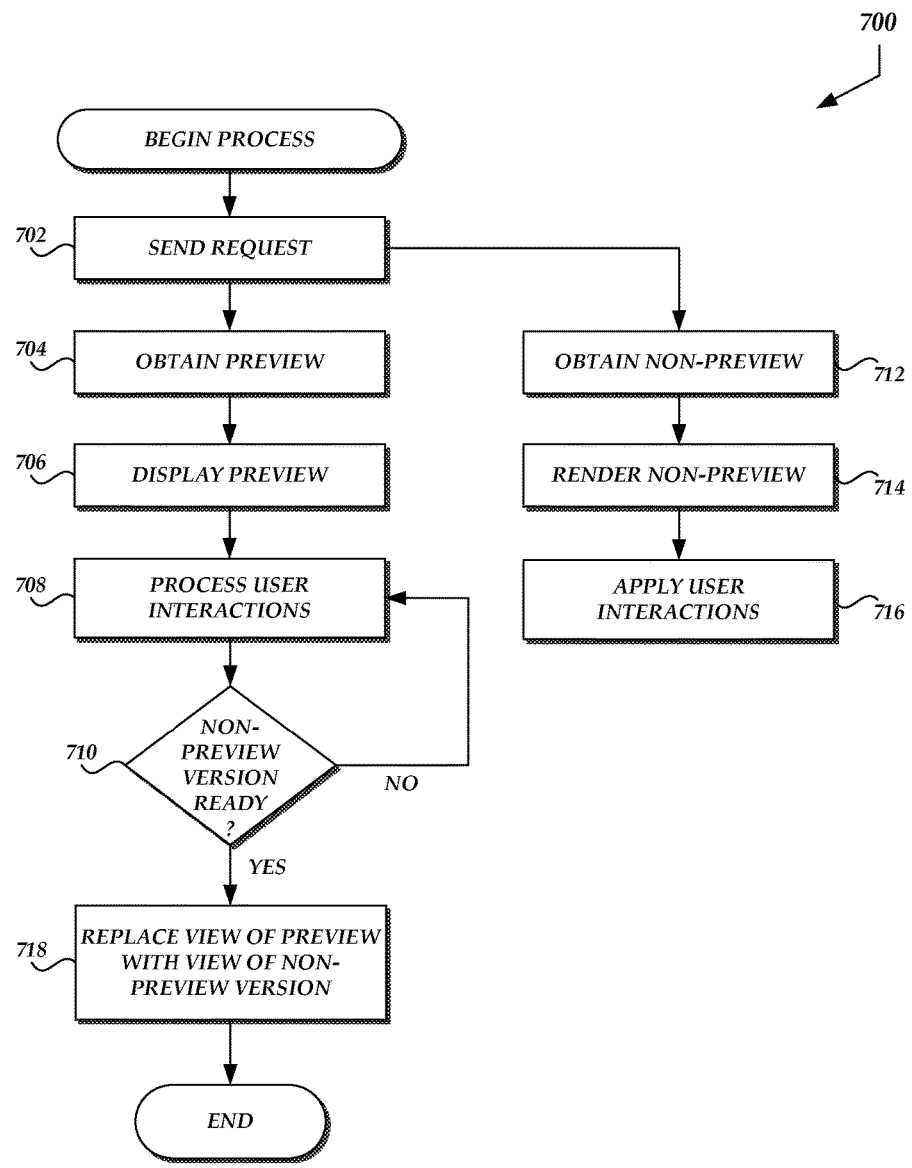
FIG. 7 illustrates a process for requesting a content item and receiving a preview version of the content item for display while a non-preview version is obtained.

FIG. 7 illustrates an embodiment of a process 700 for requesting content items and displaying a preview that is obtained in response to the request. Although the description that follows focuses on execution of the process 700 by a preview-aware browser 50, in some embodiments other components may execute the process 700, such as a non-preview-aware browser, a mobile application such as a news application (e.g., Flipboard), or the like.

A browser 50 may execute the process 700 to display previews of requested content and then subsequently display non-preview versions of the requested content. The process 700 may begin at block 702, where the browser 50 or some other component of the user device 32 sends a request for a content item to an intermediary system 30. Illustratively, the content request may be a request for a content item hosted or offered by a content site 34. In some embodiments, the browser 50 may not send the request to an intermediary system 30, but rather may send it to a third party system that provides previews, e.g., using the processes described above. In such cases, the browser 50 may send a request for a preview version to the third party system and subsequently, or in parallel, request a non-preview version from the content site 34.

At block 704, the browser 50 may obtain a preview version of the requested content item from the intermediary system 30 (or from some third party system). As described above, the preview may have been generated by the intermediary system 30, by the content site 34, or by some other entity.

At block 706, the browser 50 can display the preview. At block 708, the browser 50 can process user interactions with the preview. Illustratively, such interactions may include zooming and scrolling actions, interaction with objects provided by the intermediary system 30 in addition to the preview (e.g., text boxes), activation of image map areas that correspond to links on the requested content item, and the like.

At decision block 710, the browser 50 can determine whether a non-preview version of the requested content item has been obtained and is ready for display. If so, the process 700 can proceed to block 718. Otherwise, the process 700 can return to block 708 where the browser 50 can process user interactions.

In parallel with blocks 704-708, or subsequent thereto, the browser 50 may obtain a non-preview version of the requested content from the intermediary system 30 at block 712. In some embodiments, the browser 50 may be configured to obtain the non-preview version directly from the content site 34 or from some other source, rather than relying on the intermediary system 30 to obtain the non-preview version on behalf of the user device 32.

At block 714, the browser 50 can render the non-preview version obtained at block 712. Illustratively, the browser 50 can render the non-preview version in a separate frame buffer from the preview version, and then the browser 50 can swap the frame buffers at block 718 when the non-preview version is ready for display. If the non-preview version includes only a portion of the content item, the browser 50 can apply the non-preview portions to the preview version for display.

At block 716, the browser 50 can apply any user interactions, processed with respect to the preview version at block 708, to the non-preview version. The browser 50 can do so prior to display of the non-preview version at block 718. In this way, when the non-preview version is displayed to the user, the user experience is not hindered or interrupted by a sudden change in the display of the content. For example, if a user has scrolled or zoomed the preview, corresponding scrolling and/or zooming operations may be simulated with respect to the non-preview version prior to display of the non-preview version.

Page Previews with No Screenshots

In some embodiments, the intermediary system 30 may be configured to deliver page previews that do include any screenshots. For example, upon receiving a page request from a user device, the intermediary system 30 could (1) return a cached version of the page as the preview, optionally with modifications to support rapid delivery and rendering, and (2) retrieve the actual page, and then (3) deliver the actual page (with or without modifications) to the browser if it differs (or differs significantly) from the preview. When the actual page is delivered, the browser 50 would display it in place of the preview, as described above. The intermediary system 30 may be configured to use this approach for all pages, or to use it selectively based on an analysis of page content. Where no screenshots are included, the task of generating the preview may include, for example, eliminating scripts, eliminating advertisements, and/or reducing resolutions of embedded images.

In some embodiments, the intermediary system 30 may be configured to provide preview content that is a video display or some other dynamic view of content as it is rendered by the intermediary system 30, rather than a screenshot image of the content. For example, the intermediary system 30 may establish a remote desktop session with the user device 32 (e.g., using remote desktop protocol or some other method or protocol for transmitting remote display feeds). While a content item is rendered by the intermediary system 30, a user device may receive a video feed or other dynamic view of the content as it is rendered, such that it appears to the user that the content is being rendered locally at the user device 32. When the user device 32 receives the content, the local version may replace the video feed of the content at the intermediary system 30.

System Implementation and Variations

The intermediary system 30 may be implemented by or on a computing system that comprises one or more physical computing devices (physical servers, storage arrays, routers, etc.), each of which may include a processor and memory. The computing system may, in some cases, include computing devices that are distributed geographically, in which case some of the disclosed server-side tasks may be performed remotely from others. The various functions of the intermediary system 30 may be embodied in code modules executed by the computing system. The code modules may be persistently stored on any type or types of non-transitory computer storage devices or media (magnetic disks, solid state memories, optical drives, etc.). Some or all of the disclosed processes of the intermediary system 30 may alternatively be embodied partly or wholly in specialized computer hardware, such as in custom designed ASICs or FPGAs. The various components and functions of the intermediary system 30 can also be implemented in one or more virtual machines or cloud resources, rather than in dedicated servers. The browser 50 may include executable code stored on any type of non-transitory storage medium, including code for implementing the client-side functions described herein.

In some embodiments, the intermediary system 30 may be omitted. In such embodiments, the browser 50 may be designed or configured to concurrently (1) request/retrieve the actual page from its origin server, and (2) request/retrieve a preview of the page from a separate preview server or system. If the page preview arrives first, the browser may display it while loading the actual page in the background, and then display the actual page in place of the preview once the actual page is fully loaded. The preview server or system in such embodiments may generate and deliver the previews using the same methods as described herein. Preview servers may be set up at a variety of network locations (e.g., points of presence) and geographic locations, in which case they may be statically or dynamically assigned to user devices or page requests according to an algorithm that seeks to minimize response times as seen by users.

Although described in the context of content "pages," the methods disclosed herein are also applicable to other documents and units of content. For example, the disclosed methods can be used to provide previews of Word documents, spreadsheet files, PDF documents, and various other types of documents.

Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A non-transitory computer readable medium comprising a computer-executable browser module configured to cause a user computing device to at least:

receive, from an intermediary system in response to a first request for a content page, a preview version of the content page for temporary display, the preview version comprising multiple screenshots, each of a different respective portion of the content page, wherein the preview version additionally includes an image map specifying a location, within a first screenshot of the multiple screenshots, of a user-selectable link imaged within the first screenshot;

display the preview version of the content page on a display screen of the user computing device;

receive a non-preview version of the requested content page while the preview version is displayed on the display screen;

detect that the non-preview version of the content page is ready for display on the user computing device; and in response to detecting that the non-preview version is ready for display on the user computing device, automatically display the non-preview version of the content page on the display screen in place of the preview version of the content page;

wherein the preview version is a modified version of the content page and is at least partially optimized to reduce a loading time, such that a user-perceived load time of the content page is reduced.

2. The non-transitory computer readable medium of claim 1, wherein the browser module is further configured to render the non-preview version into a hidden display pane while the preview version is displayed.

3. The non-transitory computer readable medium of claim 2, wherein automatically displaying the non-preview version comprises replacing a display pane displaying the preview version with the hidden display pane.

4. The non-transitory computer readable medium of claim 1, wherein the browser module is further configured to cause the user computing device to:
   detect a user interaction with the displayed preview version, the user interaction resulting in a modification to the display of the preview version; and
   apply the user interaction to the non-preview version such that the modification is reflected in the display of the non-preview version.

5. The non-transitory computer readable medium of claim 4, wherein the user interaction is a page scrolling interaction performed on the preview version, and applying the user interaction comprises scrolling the non-preview version.

6. The non-transitory computer readable medium of claim 4, wherein the user interaction is a zoom interaction performed on the preview version, and applying the user interaction comprises performing a corresponding zoom operation on the non-preview version.

7. The non-transitory computer readable medium of claim 4, wherein the user interaction comprises entry by the user of text into a portion of the preview version, and wherein applying the user interaction comprises copying the text into a corresponding portion of the non-preview version.

8. A non-transitory computer-readable medium having stored thereon a browser application comprising executable program instructions that direct a user device to perform a process that comprises:
   transmitting, to an intermediary system, a request for a content page hosted by a source other than the intermediary system;
   receiving from the intermediary system, and displaying on a display screen of the user device, a preview version of the content page, the preview version transmitted to the user device in response to the request, the preview version comprising a plurality of screenshots, each of a different respective portion of the content page, wherein the preview version comprises an image map for a first screenshot of the plurality of screenshots, the image map specifying coordinates within the first screenshot of one or more user-selectable page elements imaged in the first screenshot;
   receiving from the intermediary system, separately from the preview version of the content page, a non-preview version of the content page, the non-preview version transmitted to the user device in response to the request;
   detecting that the received non-preview version of the content page is ready for display on the user device; and
   in response to detecting that the non-preview version is ready for display, automatically displaying the non-preview version on the display screen in place of the preview version;
   wherein the preview version is at least partially optimized to reduce a loading time, such that a user-perceived load time of the content page is reduced.

9. The computer-readable medium of claim 8, wherein detecting that the non-preview version is ready for display comprises detecting that background rendering of the non-preview version is complete.

10. The computer-readable medium of claim 8, wherein automatically displaying the non-preview version comprises applying to the non-preview version a scrolling operation performed by the user on the preview version.

11. The computer-readable medium of claim 8, wherein automatically displaying the non-preview version comprises applying to the non-preview version a zooming operation performed by the user on the preview version.

12. The computer-readable medium of claim 8, wherein automatically displaying the non-preview version comprises copying, onto the non-preview version, text entered by a user onto the preview version.

13. The computer-readable medium of claim 8, wherein automatically displaying the non-preview version comprises applying an update to the preview version.

14. A system, comprising:
   an intermediary computing system comprising one or more computing devices, the intermediary computing system configured to operate as an intermediary between user devices and content sites;
   a first code module that directs the intermediary computing system to at least:
      retrieve a content page from a content site;
      generate an initial version of the content page that is at least partially optimized to reduce a loading time relative to the retrieved content page, wherein generating the initial version comprises generating a plurality of screenshots, each of a different respective portion of the content page, wherein generating the initial version further comprises generating an image map for a first screenshot of the plurality of screenshots, the image map specifying coordinates within the first screenshot of one or more user-selectable page elements imaged in the first screenshot; and
      store a representation of the initial version, including the plurality of screenshots, in a cache of the intermediary computing system; and
   a second code module that directs the intermediary computing system to respond to a request from a user device for the content page by a process that comprises:
      sending to the user device the initial version represented in the cache of the intermediary computing system, the initial version including the plurality of screenshots;
      concurrently with sending the initial version to the user device, retrieving a current version of the content page from the content site; and
      sending a representation of the retrieved current version to the user device, said representation of the retrieved current version enabling the user device to update a display of the initial version to correspond to the current version, wherein the representation of the retrieved current version is an update that is based on one or more differences detected between the current version and the initial version.

15. The system of claim 14, wherein the second code module directs the intermediary computing system to detect the one or more differences by comparing content of the initial version to content of the current version.

16. The system of claim 14, wherein the initial version additionally includes a text overlay file that comprises text of the content page in a non-image format.

17. The system of claim 14, wherein sending the representation of the retrieved current version to the user device comprising (1) detecting that a screenshot of the plurality of screenshots depicts a portion of the content page that has changed, and (2) in response to said detecting, sending to the user device a replacement screenshot for the screenshot that depicts the portion of the content page that has changed.

18. The system of claim 14, wherein generating the initial version comprises selecting a screenshot resolution based on a characteristic of the user device.

19. A system, comprising:
- an intermediary computing system comprising one or more computing devices, the intermediary computing system configured to operate as an intermediary between user devices and content sites;
- a first code module that directs the intermediary computing system to at least:
  - retrieve a content page from a content site;
  - generate an initial version of the content page that is at least partially optimized to reduce a loading time relative to the retrieved content page, wherein generating the initial version comprises generating a plurality of screenshots, each of a different respective portion of the content page; and
  - store a representation of the initial version, including the plurality of screenshots, in a cache of the intermediary computing system; and
- a second code module that directs the intermediary computing system to respond to a request from a user device for the content page by a process that comprises:
  - sending to the user device the initial version represented in the cache of the intermediary computing system, the initial version including the plurality of screenshots;
  - concurrently with sending the initial version to the user device, retrieving a current version of the content page from the content site; and
  - sending a representation of the retrieved current version to the user device, said representation of the retrieved current version enabling the user device to update a display of the initial version to correspond to the current version, wherein the representation of the retrieved current version is an update that is based on one or more differences detected between the current version and the initial version;
- wherein generating the initial version comprises generating a first screenshot of an upper portion of the content page that is visible prior to page scrolling, and a second screenshot of a portion of the content page falling below the upper portion, and wherein sending the initial version to the user device comprises sending the first screenshot before sending the second screenshot.

* * * * *